Jan. 25, 1938. P. E. HUNTER 2,106,602
METHOD OF MAKING FENCE POSTS
Filed Jan. 28, 1937 2 Sheets-Sheet 1
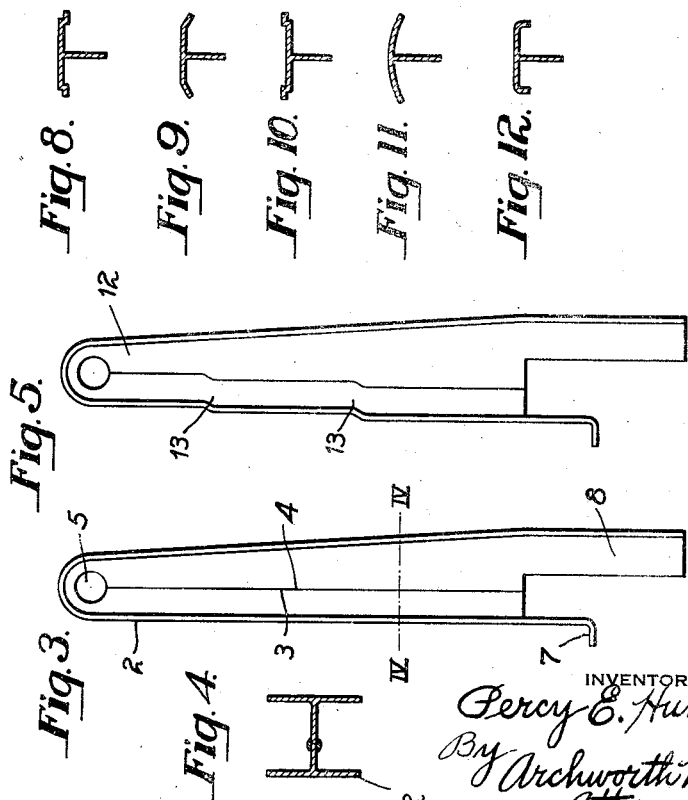
INVENTOR
Percy E. Hunter,
By Archworth Martin
Attorney.

Jan. 25, 1938. P. E. HUNTER 2,106,602
METHOD OF MAKING FENCE POSTS
Filed Jan. 28, 1937 2 Sheets-Sheet 2

INVENTOR
Percy E. Hunter,
By Archworth Martin,
Attorney.

Patented Jan. 25, 1938

2,106,602

UNITED STATES PATENT OFFICE 2,106,602

METHOD OF MAKING FENCE POSTS

Percy E. Hunter, Pittsburgh, Pa.; L. T. Copeland and Fidelity Trust Company, administrators of said Percy E. Hunter, deceased, assignors to Hunter Steel Company, Pittsburgh, Pa., a corporation of Pennsylvania Application January 28, 1937, Serial No. 122,744

3 Claims. (Cl. 29—155)

My invention relates to posts that are particularly suitable for use in connection with bridge railings, fences, brackets etc., and which also may be put to other uses.

One object of my invention is to provide a post of such form that it can be cheaply and conveniently made in various forms from standard rolled shapes such as T's, I-beams and H-beams.

Another object of my invention is to provide a post of the character referred to which, for a given weight or amount of material, will be of much greater strength than a cast post, and which will be of simpler and more durable form than posts heretofore made of a plurality of assembled parts.

Figure 13:
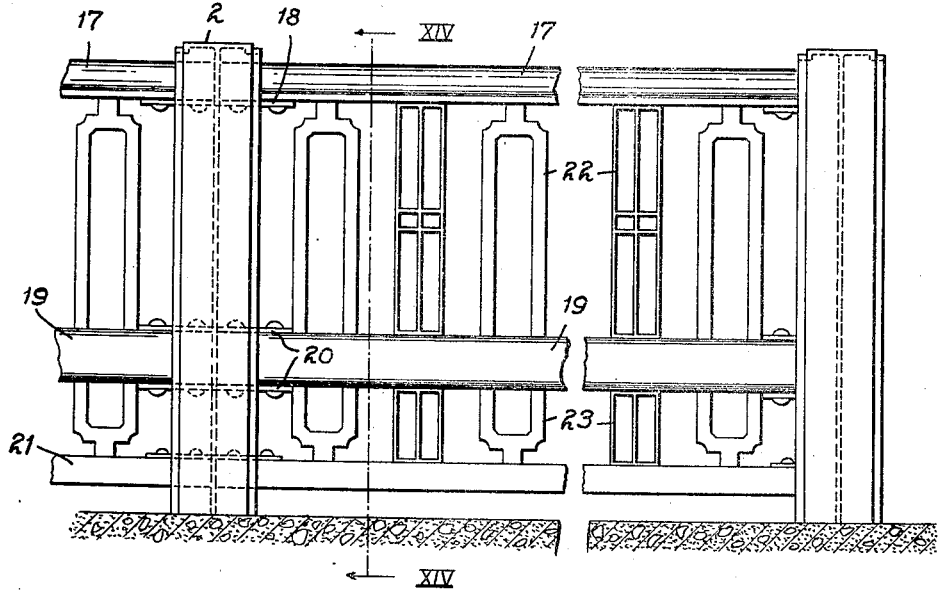
Figure 14:
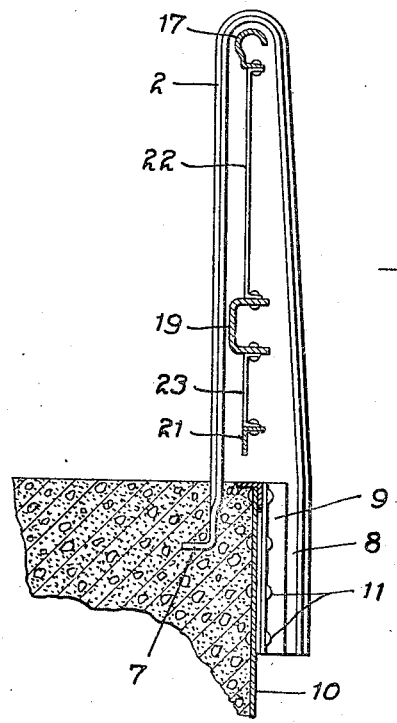

Some of the various forms of posts which may be produced in accordance with my invention are shown in the accompanying drawings wherein Figure 1 is a side view showing an H-beam which has portions of its web cut away to form two post members; Fig. 2 is an end view thereof; Fig. 3 is a side view of a post formed from one of the members of Fig. 1; Fig. 4 is a view taken on the line IV—IV of Fig. 3; Fig. 5 is a view similar to that of Fig. 3 but showing a post of somewhat different shape; Figs. 6 and 7 are respectively side and end views showing a manner in which the flanges of a post element may be shaped to a desired contour, between rolls; Figs. 8 to 12 show various contours to which the flanges of the post sections may be bent to form post faces of various designs; Fig. 13 is a face view of a portion of a fence showing rails and panels assembled with the posts, and Fig. 14 is a view taken on the line XIV—XIV of Fig. 13.

Referring first to Figs. 1 and 2, I show an H-beam, portions of whose web have been removed by sawing, shearing, or flame cutting methods, to form post members 2 of T form in cross section, that may be duplicates of one another, and each of which can be bent to form the post of Figs. 3 and 4, and could also be shaped to form posts of other contours such as that shown in Fig. 5.

It will be noted that the cuts at 3 are along lines parallel to the flanges of the beam; that the cuts on the lines 4 are diagonal thereto; that a greater amount of metal is cut away at 5, and that there is further cutting away of the web at 6.

After the removal of a portion of the web metal as indicated in Fig. 1, each of the members 2 may be utilized to form a complete post. In order to give a more finished or decorative appearance to the front and rear faces of the post, the flanges thereof may be shaped to various forms as shown, for example, in Figs. 8 to 12, and as hereinafter explained. A post is then formed by bending one of the members 2 at the zone 5 so that the edge portions 3 and 4 thereof will be brought into abutting engagement as shown in Figs. 3 and 4, and in most instances these edges 3 and 4 will be welded together, as indicated in Fig. 4. The post will then have an upper opening at 5 through which a hand railing or cable or both may extend, or through which may extend a connecting element for hand rails.

The cutting away of the metal at 6 provides for footed extensions of the post, one extension being bent at 7 to form an angle that may be imbedded in concrete for anchorage purposes, as shown in Fig. 14. The other extension, as indicated by the numeral 8, can either simply be imbedded in the concrete or secured to an anchoring member. In Fig. 14 this extension 8 is shown as having an angle 9 welded or riveted thereto, which angle serves as a convenient means for connecting the post to a facia plate 10 of a bridge, by means of rivets 11.

The cutting away of a wider portion of the web at 5 has the further advantage of facilitating the bending of the members 2 to the form shown in Fig. 3 without tearing of the metal or buckling the stem of the T at the lines of bend.

It will be seen that owing to the angularity of the edges 4, the post of Fig. 3 is of greater width at its lower end than at its upper end, and that this tapering form could be still further increased by increasing the angle of the cuts at 4. It will also be understood that if the cuts 4 were made parallel to the cuts 3 and to the flanges, a completed post would be of uniform width from its top to its bottom.

In order to produce the ornamental stepped effect at the front side of the post 12, as in Fig. 5, one of the post members 2 may be placed in a press so as to produce the offset effects at 13.

Where it is desired to give a finished or a convex surface to the faces of the posts, the members 2 can be pressed or rolled for the purpose of bending the flanges of the post to desired forms. For example, in order to make a post having its exposed side of the form shown in Figs. 8, 13, and 14, the member 2 can be passed between rolls 14 and 15 as shown in Figs. 6 and 7, or the shaping could be effected by use of a press. It will be seen that the roll 15 is slotted along a central peripheral line for the reception of the stem of the member 2, and that the peripheral surfaces of the rolls are suitably offset to bring the head of flanges of the member to the desired shape.

Figs. 9 to 12 show various other forms of post faces which can be produced in a similar manner.

In Figs. 13 and 14, I show a manner in which fence railings and panels may be connected to the posts. The rails 17 are connected by a splice bar 18 which extends through an opening such as the hole 5 in the web of the post, while buffer rails 19 are connected by splice bars 20 which extend through suitable holes punched through the web of the post, and the bottom rails 21 may be similarly connected. Panels or pickets 22 and 23 are suitably connected to the rails.

It will be understood that the terms H-beams and I-beams are employed in a broad sense in the specification and claims hereof, and that the term H-beam is intended, in the claims, to be sufficiently comprehensive to include similar shapes such as those commonly designated as I-beams.

I claim as my invention:

1. The method of making posts and the like, which comprises dividing the web of an H-beam along longitudinally-extending lines, to form two T members which are substantially duplicates and each of which has the edge of the major part of its stem at one side of its longitudinal mid point approximately parallel to the head of the T and that portion of the stem at the other side of said point cut on a diagonal line, and then bending each of said members about a transverse axis such distance that the stem portions of each member are brought into abutting engagement.

2. The method of making posts and the like, which comprises dividing the web of an H-beam along longitudinally-extending lines, to form two T members which are substantially duplicates and each of which has the edge of the major part of its stem at one side of its longitudinal mid point approximately parallel to the head of the T and the edge of that portion of the stem at the other side of said point cut on a diagonal line, which renders the last-named stem portion of decreasing width toward the said mid point, and then bending each of said members about a transverse axis such distance that the stem portions of each member are brought into abutting engagement.

3. The method of making posts and the like, which comprises dividing the web of an H-beam along longitudinally-extending lines, to form two T members which are substantially duplicates and each of which has the edge of the major part of its stem at one side of its longitudinal mid point approximately parallel to the head of the T and that portion of the stem at the other side of said point cut on a diagonal line, removing a substantial portion of the web adjacent to said mid point, and then bending each of said members about a transverse axis such distance that the stem portions of each member are brought into abutting engagement.

PERCY E. HUNTER.